United States Patent
Berstis et al.

(10) Patent No.: US 6,735,694 B1
(45) Date of Patent: *May 11, 2004

(54) METHOD AND SYSTEM FOR CERTIFYING AUTHENTICITY OF A WEB PAGE COPY

(75) Inventors: Viktors Berstis, Austin, TX (US); Maria Azua Himmel, Austin, TX (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/976,380

(22) Filed: Nov. 21, 1997

(51) Int. Cl.[7] .................................. H04L 9/32
(52) U.S. Cl. ........................ 713/178; 713/176
(58) Field of Search ............. 713/178, 187, 713/176

(56) References Cited

U.S. PATENT DOCUMENTS

| | | | | |
|---|---|---|---|---|
| 5,136,647 A | * | 8/1992 | Haber et al. ............... 380/49 |
| 5,497,421 A | * | 3/1996 | Kaufman et al. ........... 380/23 |
| 5,535,276 A | * | 7/1996 | Ganesan .................... 380/25 |
| 5,708,780 A | * | 1/1998 | Levergood et al. ........ 709/229 |
| 5,757,916 A | * | 5/1998 | MacDoran et al. ........ 380/25 |
| 5,812,776 A | * | 9/1998 | Gifford ..................... 709/217 |
| 5,822,432 A | * | 10/1998 | Moskowitz et al. ........ 380/28 |
| 5,937,160 A | * | 8/1999 | Davis et al. ............... 707/10 |
| 6,021,439 A | * | 2/2000 | Turck et al. ............... 709/224 |
| 6,026,166 A | * | 2/2000 | LeBourgeois ............. 380/25 |
| 6,105,012 A | * | 8/2000 | Chang et al. .............. 705/64 |

OTHER PUBLICATIONS

Schneier, Bruce, Applied Cryptography 2nd Edition, 1996, pp. 40–41.*

* cited by examiner

Primary Examiner—Gilberto Barrón
Assistant Examiner—Douglas Meislahn
(74) Attorney, Agent, or Firm—Jeffrey S. LaBaw; Joseph R. Burwell; David Judson

(57) ABSTRACT

A method and system of certifying that a copy of a Web page was made at a particular time by a user of a Web client. A client piece preferably includes a one-way hashing function that, when applied to a Web page copy, generates a unique string. The string is concatenated with a URL for the Web page, a timestamp and other identifying information, to generate a signature. Using a public key cryptosystem, the signature is provided to a certification server. Upon receipt, the server first determines whether the signature represents the Web page copy. If so, a confirmation is sent to the client, and the signature is stored in a database. Preferably, the Web page copy itself is not stored in the database. Signatures from other Web page copies received during a given period (e.g., the same day) are then summed and the sum is published. Later, when the user desires to verify that the Web page copy is authentic, a determination is made regarding whether application of the given function to the page generates a signature previously stored in the database and/or a value equal to the published sum for the given day. If so, the Web page copy is accepted as authentic.

17 Claims, 4 Drawing Sheets

METHOD AND SYSTEM FOR CERTIFYING AUTHENTICITY OF A WEB PAGE COPY

BACKGROUND OF THE INVENTION

1. Technical Field

The present invention relates generally to transactions over computer networks and more particularly to a method and system for certifying that a given copy of a Web page is authentic.

2. Description of the Related Art

The World Wide Web is the Internet's multimedia information retrieval system. In the Web environment, client machines effect transactions to Web servers using the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator or Microsoft Internet Explorer) at a client machine involves specification of a link via the URL. In response, the client makes a request to the server (sometimes referred to as a "Web site") identified in the link and, in return, receives in return a document or other object formatted according to HTML.

Given content on a Web page may be time-sensitive. Thus, for example, the Web page may include an advertisement or coupon for a given product or service offering, and such advertisement or coupon may need to be printed and delivered to the vendor for redemption or to prove that an offer existed at a given time (namely, when the page was viewed by the user and the copy made). In another application, a given Web page may include information evidencing or relating to a financial transaction. In this example, transaction or other verification may involve proof that the Web page had certain information content before, during or after the transaction. Although it is known in the art to make a copy of a Web page, there is no convenient method in the art for certifying that the copy itself was made at a given time.

It would be very desirable to be able to make a copy of a given Web page that could then be certified as "authentic". The present invention addresses this problem.

SUMMARY OF THE INVENTION

It is thus a primary object of the present invention to enable a user of a Web browser to make a certified copy of a Web page or other document object.

It is a further object of this invention to certify that a given Web page or file, or some content therein, existed at a particular time.

It is still another important object of this invention to provide a certification service to enable third parties to obtain proof that a given document or some portion thereof existed at a given time or during a given time period.

Still another object of this invention is to store, in a publicly-accessible location, information from which a given entity may verify the authenticity of a document or some content thereof.

It is still another primary object of this invention to provide a Web page certification service that is useful is authenticating Web page copies.

It is another more general object of this invention to manage the administration, collection and use of certified copies of documents or objects in an open computer network environment such as the World Wide Web of the Internet.

In one particular embodiment, a Web site supports a Web page. A user of a Web client connectable to that Web site makes a copy of the Web page or some identifiable portion thereof. The user desires to "prove" or "validate" his or her "copy" at some later time or upon a given occurrence. To this end, a "certified" copy is generated at the client machine. Preferably, this certification is accomplished by applying a given mathematical transform (e.g., a one-way hashing function) to the copy of the page (or some portion thereof) to generate a string. The one-way hashing function has the property that the resulting string is of sufficient length and content that it cannot be reproduced through any other search method or function. The string is then concatenated with given identifying information (e.g., the Web site URL, a timestamp and, optionally, a user identifier) to generate a signature. To facilitate later verification, the signature is then provided to a certification server located elsewhere in the computer network.

Upon receipt, the certification server first verifies that the information in the signature is authentic. To this end, the certification server obtains the URL within the signature and, using the URL, retrieves the specified Web page. The newly-retrieved Web page is then applied through the same one-way function used at the client machine. If the resulting bit string matches the string in the signature, the certification server provides a confirmation to the client. The signature is also stored in a database associated with the server, although preferably the server does not store the Web page itself to conserve memory. Further, the certification server preferably combines the signature with all other signatures received during a given time period (e.g., during a particular day) to generate a checksum (or other given function) of all or a given number of the signatures. This value is then published in a convenient location (e.g., a newspaper).

Later, when the user desires to prove that he or she has a true and correct copy of the Web page, the user presents the Web page copy (and, optionally, the server confirmation) to a given entity (which may be the certification server itself). If running the one-way function then produces the same bit string that is logged in the server's database for the date, the copy is certified as authentic. As another check, the server may also re-calculate the checksum (or other given function) and compare it to the value original published for the particular date in question. The checksum guarantees that the information associated with a given signature has not changed.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
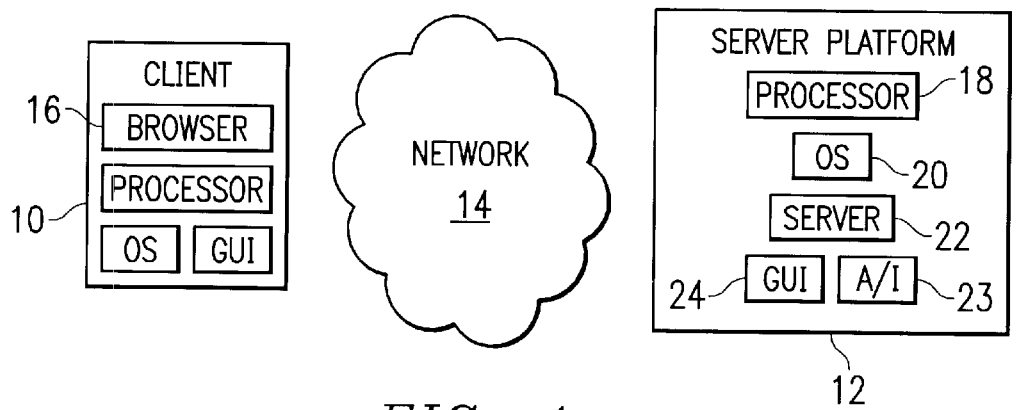
FIG. 1 is a representative system in which the present invention is implemented.

The present invention is preferably implemented in a client-server computer network. Thus, by way of background, a representative Web client/Web server is illustrated in FIG. 1. In particular, a client machine 10 is connected to a Web server platform 12 via a communication channel 14. For illustrative purposes, channel 14 is the Internet, an intranet, an extranet or any other known network connection. Web server platform 12 is one of a plurality of servers which are accessible by clients, one of which is illustrated by machine 10. A representative client machine includes a browser 16, which is a known software tool used to access the servers of the network. The Web server platform (sometimes referred to as a "Web" site) supports files in the form of hypertext documents and objects. The network path to a server is identified by a Uniform Resource Locator (URL), as is well-known.

A representative Web Server platform 12 comprises an IBM RISC System/6000 computer 18 (a reduced instruction set of so-called RISC-based workstation) running the AIX (Advanced Interactive Executive Version 4.1 and above) Operating System 20 and a Web server program 22, such as Netscape Enterprise Server Version 2.0, that supports interface extensions. The platform 12 also includes a graphical user interface (GUI) 24 for management and administration. The Web server 18 also includes an Application Programming Interface (API) 23 that provides extensions to enable application developers to extend and/or customize the core functionality thereof through software programs commonly referred to as "plug-ins."

A representative Web client is a personal computer that is ×86-, PowerPC®- or RISC-based, that includes an operating system such as IBM® OS/2® or Microsoft Windows 95, and that includes a browser, such as Netscape Navigator 3.0 (or higher), having a Java Virtual Machine (JVM) and support for application plug-ins.

Figure 2:
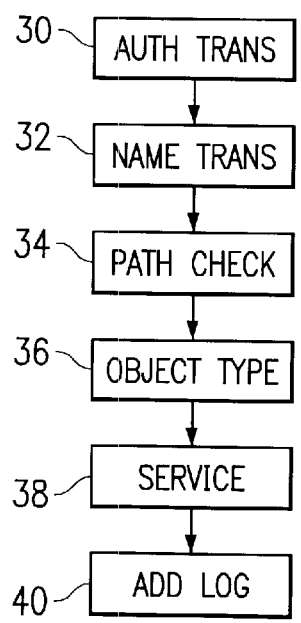
FIG. 2 is a flowchart illustrating the conventional processing associated with an HTTP request from the Web client to the Web server shown in FIG. 1.

As is well-known, the Web server accepts a client request and returns a response. The operation of the server program 22 is governed by a, number of server application functions (SAFs), each of which is configured to execute in a certain step of a sequence. This sequence, illustrated in FIG. 2, begins with authorization translation (AuthTrans) 30, during which the server translates any authorization information sent by the client into a user and a group. If necessary, the AuthTrans step may decode a message to get the actual client request. At step 32, called name translation (NameTrans), the URL associated with the request may be kept intact or it can be translated into a system-dependent file name, a redirection URL or a mirror site URL. At step 34, called path checks (PathCheck), the server performs various tests on the resulting path to ensure that the given client may retrieve the document. At step 36, sometimes referred to as object types (ObjectType), MIME (Multipurpose Internet Mail Extension) type information (e.g., text/html, image/gif, etc.) for the given document is identified. At step 38, called Service (Service), the Web server routine selects an internal server function to send the result back to the client. This function can run the normal server service routine (to return a file), some other server function (such as a program to return a custom document) or a CGI program. At step 40, called Add Log (AddLog), information about the transaction is recorded.

Figure 3:
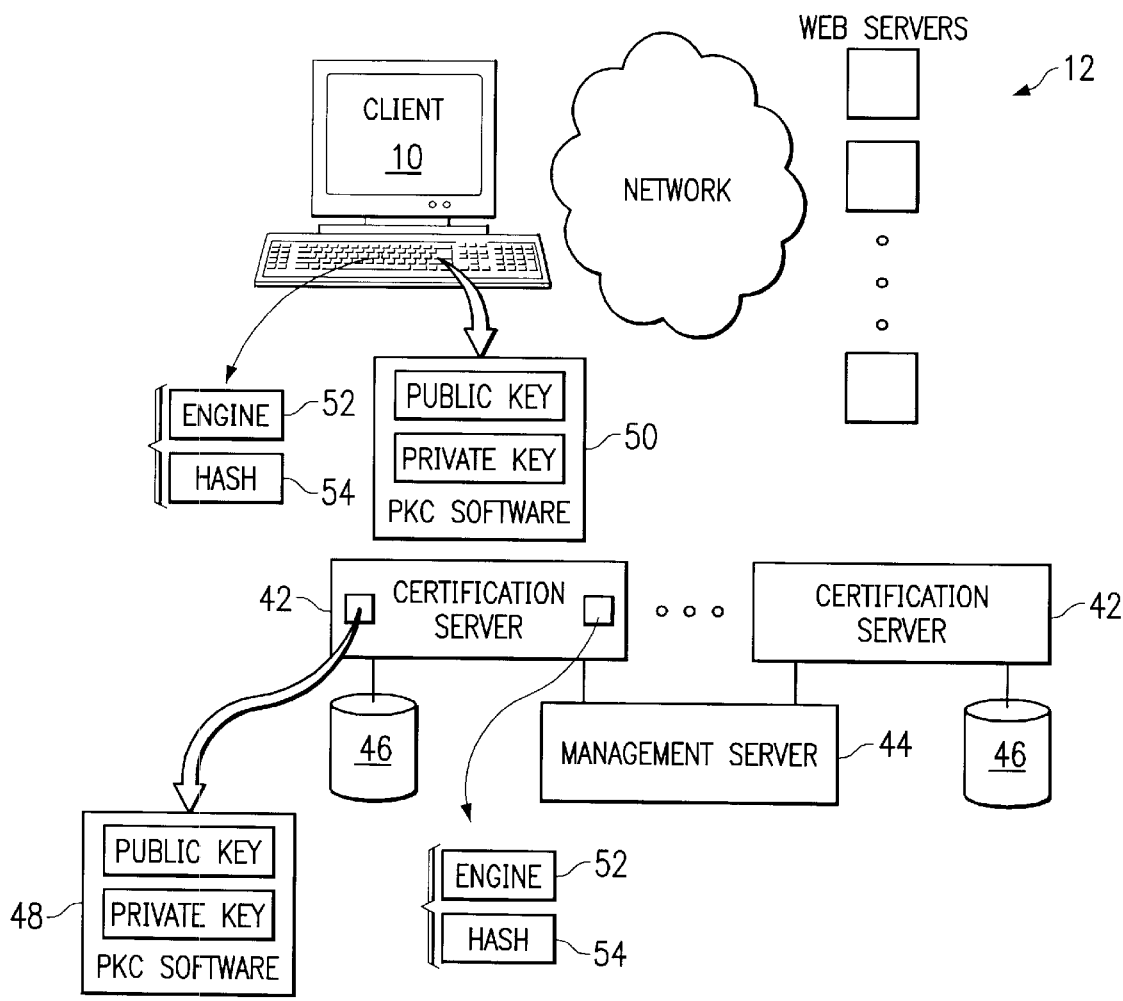
FIG. 3 is a simplified block diagram of a Web page certification service according to a preferred embodiment of the present invention.

FIG. 3 is a block diagram of a preferred certification service according to the present invention.

There is at least one client machine 10 connectable to one or more Web sites 12 that support Web pages or other such objects. One or more certification servers 42 are also present in the computer network. If more than one certification server is used, there may also be a management server 44 for managing the overall operation of the certification servers. Each of the certification servers includes a database 46 associated therewith, as well as a public key cryptosystem (PKC) 48. The client machine 10 also includes its own PKC software 50.

To facilitate the present invention, the client machine and each certification server preferably include a certification engine 52. Certification engine executes various control routines (as well be described below) to carry out the objects of this invention. The client, and each certification server, also each include a predetermined (e.g., one-way) function 54. A given client and certification server share the same one-way function, although multiple such functions may be implemented throughout the certification service. Although not meant to be limiting, the certification engine 52, the one-way function 54 and the PKC software 48, are provided to the client machine by being downloaded to the client from the certification server, the management server, or from some other source. The software may also be supported on a given medium such as a CD-ROM or the like.

By way of further background, the public key cryptosystem (namely, software 50 running on a certification server, and software 48 running on the client machine) are useful in providing secure point-to-point communications between the client and the certification server. One of ordinary skill in the art will also appreciate that other techniques may be used to secure this communication channel (such as a private key cryptosystem using a session key, or the like). Alternatively, communications between the client and the certification server may not be secured by dedicated encryption software (which, for example, may be the case where the portion of the network is already secure or security is not required). In the preferred embodiment, however, a PKC is used as the software 48 and 50 is readily available and easy to use. A representative software PKC product is known in the art as PGP (Pretty Good Privacy), which is available for download over the Internet.

Figure 4:
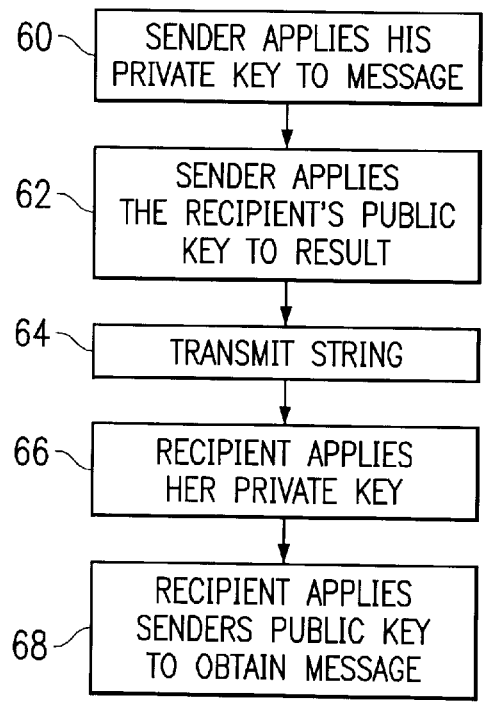
FIG. 4 is a simplified flowchart of a public key cryptosystem.

As is well-known, a public key cryptosystem enables a pair of parties, each of whom have a public key and a private key "pair", to send and receive messages in a secure fashion. In particular, the sender can verify that only the recipient (and not some third party) gets the message, and the recipient can verify that the sender was the only party who could have sent the message. FIG. 4 illustrates the conventional private key cryptosystem operation. It is assumed that the sender (the first party) desires to send a given message to the recipient (the second party). As used herein, the sender or recipient may be a person, a device, a computer, a computer program, or some process or function. At step 60, the sender applies his private key to the message. At step 62, the sender applies the recipient's public key to the result of step 60. The resulting string is then sent to the recipient at step 64. At step 66, the recipient applies her private key to the received string. Thereafter, at step 68, the recipient decrypts the result by applying the sender's public key to obtain the message. Thus, a known public key cryptosystem of this type facilitates point-to-point secure communications between sender and recipient.

The present invention provides a method and system for making a certified copy of a Web page in a client-server based computer network. A public key cryptosystem is preferably used to transport information about the certified copy throughout the network. As used herein, "certification" or "certified" means that a given entity can verify that a given Web page copy was made on a given date. As used herein, a given entity may be a device, a person, a group of persons, a legal entity, a device, a group of devices, a computer, or any combination of the above.

Figure 5:
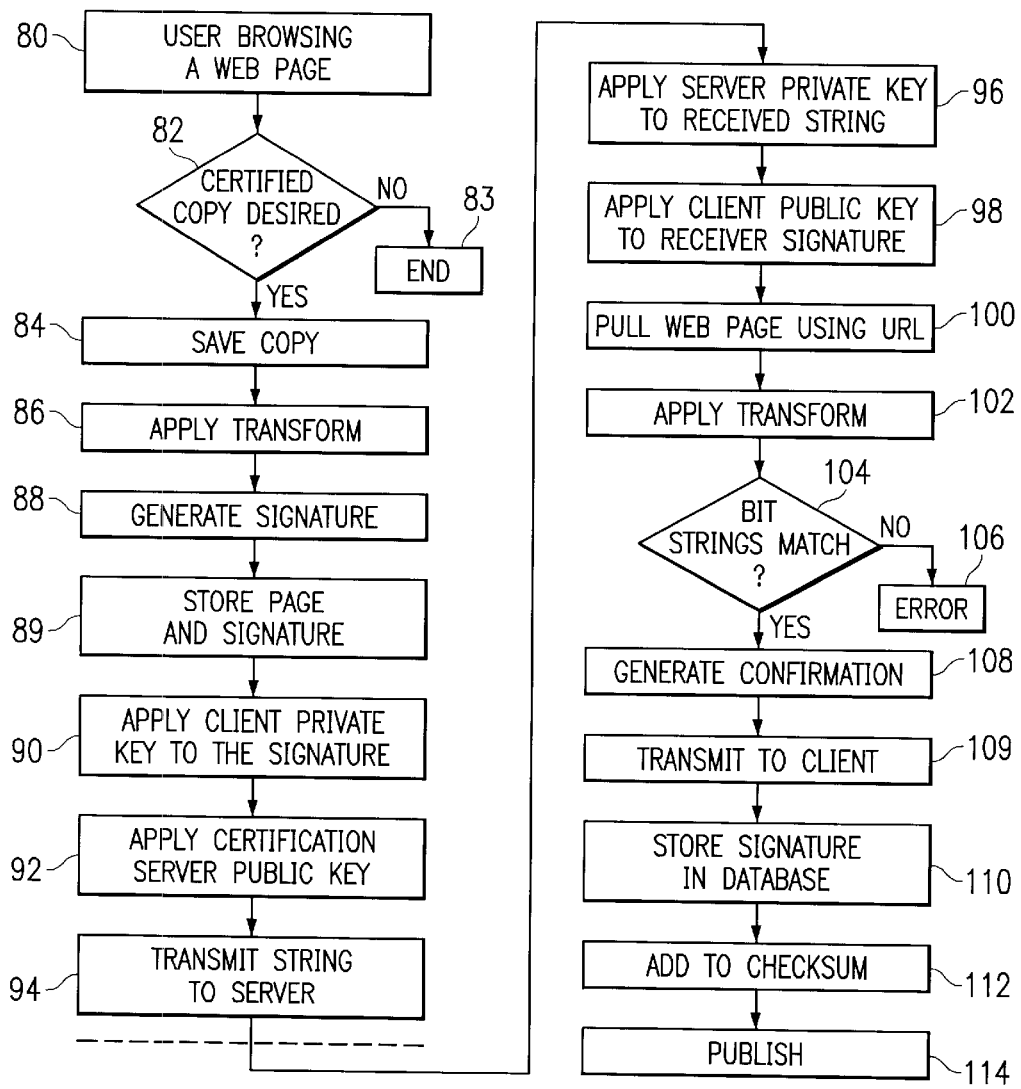
FIG. 5 is a flowchart illustrating how the public key cryptosystem of FIG. 4 is useful in the certification service of FIG. 3.

The preferred method is illustrated in FIG. 5 and begins at step 80 with user browsing a given Web page. The Web page has been pulled from the server using the method described above with respect to FIG. 2. At step 82, a test is made to determine whether the user desires to make a certified copy of the page. If not, the routine ends at step 83. If, however, the outcome of the test at step 82 indicates that the user desires to make a copy, the routine continues at step 84 with the user making a copy. One particular technique for making a copy is described in copending application Serial No. xx/xxx,yyy, titled "METHOD FOR SAVING A WEB PAGE TO A LOCAL HARD DRIVE TO FACILITATE CLIENT SIDE BROWSING" filed Sep. 22, 1997, and assigned to the assignee of the present invention. That application is incorporated herein by reference.

According to that application, a Web page is saved by first copying a base HTML document of the Web page to the client local storage. A first linked list of the hypertext references (i.e. the <a href> markup tags) in the base document is then generated. Thereafter, and for each hypertext reference in the base document associated with an embedded object, a file copy of the embedded object is saved to the client local storage, and a fully-qualified URL to the saved object (i.e. a path name to the local storage) is stored into a second linked list. Other hypertext references in the base HTML document are also stored in the second linked list as fully-qualified URLs (namely, URLs pointing to network addresses). When the user desires to retrieve the copy, a link to the pointer is activated.

Although the above "copy" technique is preferred, any other convenient technique may be used. Thus, for example, the copied page may be generated by capturing a "screen shot" of the page although, in such case, it may be desirable to process the resulting image to filter out display artifacts or effects caused by local display settings. In any case, whatever particular "copy" technique is implemented at the client is also then implemented at the certification server during a verification step described below with respect to step 100.

Moreover, it is not necessary or required that the entire page be copied at step 84. This is desirable because a given page object (e.g., an animation or an applet) may vary on a dynamic basis, and such variation may complicate further processing of the page through the cryptographic transform described below. The "copy" as used herein thus may comprise only a given piece or component of the overall page, and that component need not necessarily be "visible".

At step 86, the routine applies a given transform to a concatenation of: (a) the digital data comprising the copied page (or given portion thereof); and (b) certain identifying information. The identifying information, which is optional, comprises one of more of the following: the URL of the Web page, a timestamp and a user identifier.

Thus, for example, the transform may be a suitable "one-way" hashing function that generates a string having a relatively small length (approximately 100–1000 bits, although other lengths may be used) as compared to the size of the page itself. By way of example only, the one-way function may be any one or more of several well-known hashing functions such as one obtainable from the DES scheme or the Goldwasser, Micali & Rivest scheme. Alternatively, the one-way function may be an identity function where the size of the page input to the function is relatively small. One-way functions are functions that are easy (for everyone) to compute but hard (for everyone) to invert. The string output from step 66 may be approximately 100–1000 bits, which is sufficiently long enough that a brute force search (using even the most sophisticated tools) could not generate the same bit string.

At step 88, the string (resulting from the one-way function) is preferably concatenated with identifying information comprising, for example, one of more of the following: the URL of the Web page, the timestamp and the user identifier. The result of step 88 is a "signature" of the copied page that includes sufficient information for verifying the content and the date and/or time the page was originally copied. Although concatenation is this preferred way of generating the signature, other functions of the components may be used. At step 89, the copied page and the signature are stored at the client.

In the preferred embodiment, the signature is saved at a given certification server, preferably using a public key cryptosystem. To this end, at step 90, the Web client's private key is first applied to the signature (namely, the concatenation of the bit string and the identifying information). At step 92, the Web client applies the public key of a certification server to the string resulting from step 90. The result is then transmitted to the certification server at step 94.

Processing then continues at the certification server. In particular, at step 96, the certification server first applies its private key to the received string. At step 98, the server applies the client's public key to the output resulting from step 96. This generates what purports to be a "signature" and, in particular, the original bit string and the identifying information. The identifying information should include information purporting to be a URL. If it does, the routine continues at step 100, wherein the server pulls the Web page identified by the URL. This may be accomplished using a browser running on the certification server, or by any other convenient means. At step 102, the received Web page is then applied through the same one-way function used at the client machine at step 86. A test is then performed at step 104 to determine whether the bit string resulting from the one-way function (in step 102) matches the bit string decrypted from the received signature. If the strings do not match, an error message is generated at step 106. If, however, the strings match, the Web page is authentic.

Thus, the routine continues with the certification server generating a confirmation at step 108. At step 109, the confirmation is transmitted back to the client, which preferably stores the confirmation together with the signature. At step 110, the signature (which has now been confirmed) is stored in the database 46 of the certification server. The Web page itself (downloaded at step 100) need not be (and preferably is not) stored in the server database to preserve memory. To provide an additional level of security, the routine then continues at step 112 with the certification server adding the signature to all other signatures received during a given time period (e.g., the particular day). This generates a checksum of all signatures. Step 112, of course, may involve any suitable function of the signatures (or portions thereof) and not merely a checksum (which is preferred). At step 114, the signatures and/or the checksum are published or otherwise made available publicly. Thus, for example, the information may be published. As used herein, publication may involve posting the signatures and/or checksum in some publicly-accessible manner (e.g., on a computer bulletin board, on a given Web page, in a printed manner such as a newspaper, or the like). Any particular technique for publishing the information is within the scope of the present invention.

Now, assume that a user of the client machine later desires to prove that he or she saw the Web page on the given date (i.e. when the Web page copy was first created) Thus, for example, the user may desire to prove in Court that a particular copy in his or her possession was made on a given day. The user may desire to prove to a vendor of a particular good or service that his or her copy includes a coupon or other advertisement that affords the user some product or service discount (if the copy is valid). One of ordinary skill in the art will appreciate that the particular applications of the invention are quite varied, and thus the invention should not be construed to be limited to any particular use of the copy.

Figure 6:
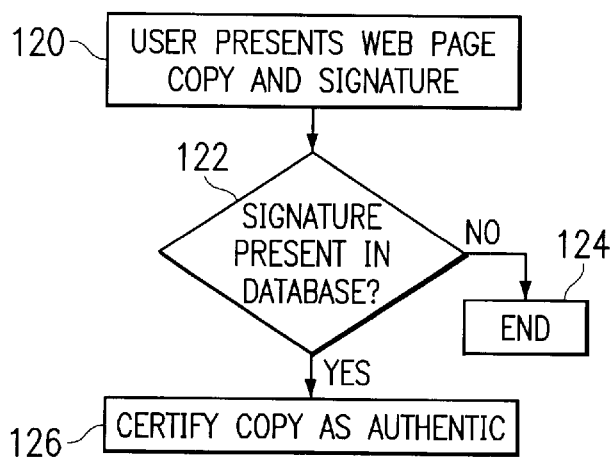
FIG. 6 is a flowchart illustrating a preferred operation of the certification server in response to a user inquiry.

A preferred verification routine is illustrated in the flowchart of FIG. 6. The routine begins at step 120 (at some subsequent date) with the user (or some person or entity on the user's behalf) presenting the Web page and the signature (and optionally, the confirmation) to a given entity. The given entity is a person or entity, a computer, a secure device, a combination thereof, or the like. Typically, the given entity is the certification server, but this is not a requirement of the present invention. At step 122, a test is made to determine whether the particular signature is present in the server database. If necessary, step 122 may involve re-generating a new bit string "on the fly" from the Web page copy presented by the user and then testing whether a new signature (generated as a result) is already present in the server database. If the outcome of the test at step 122 is negative, then verification is denied at the routine terminates at step 124. If, however, running the one-way hash function on the presented Web page produces the same bit string originally generated (at step 102) and that string is listed as a component of a signature, from the user, in the database, then the routine continues at step 126. At this point, the copy presented by the user is (or may be) certified as authentic.

Figure 7:
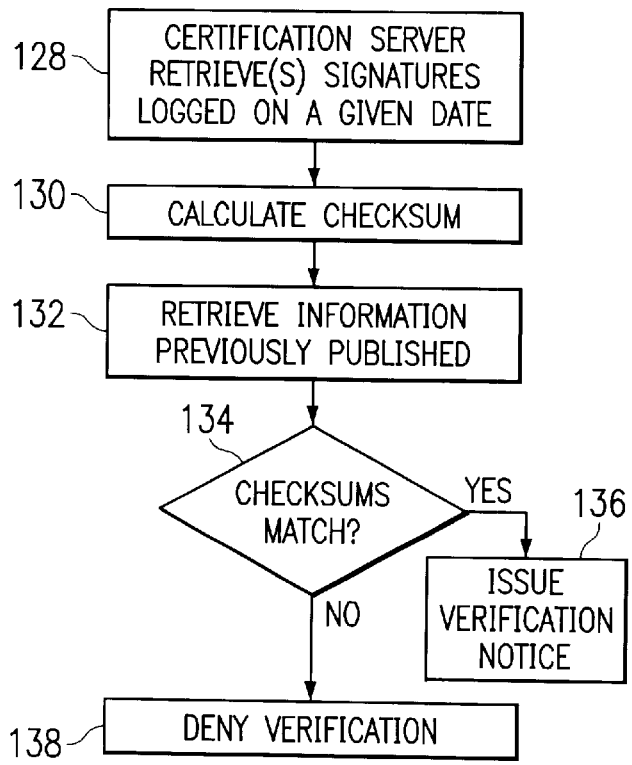
FIG. 7 is a flowchart illustrating an additional security technique that is preferably implemented to verify the authenticity of a particular Web page copy.

If desired, an additional level of security may also be provided by the certification server once the timestamp component of the signature is authenticated. This routine is illustrated in FIG. 7. It begins at step 128 after the given entity verifies that the certification server (which may be entity itself, as previously noted) logged the particular signature on the given date. At step 128, the certification server retrieves the signature(s) logged on the given date. At step 130, a checksum (or other given function) of the signatures is calculated. The routine then continues at step 132 with the given entity retrieving a copy of the information published at step 114. At step 134, a test is performed to determine whether the checksums (or some other information) match. If the outcome of the test at step 134 is positive, the routine issues a verification notice at step 136; otherwise, verification is denied at step 138. This completes the processing.

Thus, in accordance with the preferred embodiment, a given copy of a Web page may be shown to be authentic by presenting the copy to some given entity to verify. By running the one-way encryption function on the copy, the given entity can check to determine whether the signature was previously stored in the certification server database. This test determines whether the server logged the particular signature on the particular date in question. If so, an indication is or may be provided that the copy is authentic. Before this indication is provided, the certification server may also run an additional test to verify that a checksum (or other function) of the signatures generated for the day in question matches a checksum previously generated for that day.

The present invention is highly advantageous because the certification server need not store the Web page copies in order to provide the verification service. This advantage is provided in part through the use of the one-way function. In particular, if any bit in the Web page copy were altered, it is unlikely that one could have altered enough other bits in the Web page to generate the same output string.

One of ordinary skill will appreciate that the applications of this invention are quite varied. One particular application is the certification of a given financial transaction. Thus, for example, a given one-way function may be deemed to be an "authentication" function that is applied to a copy of the Web page (or portion thereof) in which the financial transaction (e.g., a bank transfer) is recorded. The resulting signature may then be provided to a certification server and maintained with other such signatures, each of which is produced from a respective Web page. In response to a subsequent request to authenticate the financial transaction, a determination is then made (e.g., by the certification server) whether the application of the authentication function generates a signature within the set of stored signatures. If so, an indication is provided that the financial transaction is authentic.

The above-described functionality thus includes a "client" side piece and a "server" side piece. The client piece may be built into the browser directly, or it may be provided via a plug-in or helper application, a via a standalone Java application or a network-loaded Java applet. A preferred implementation is provided through the browser application programming interface (API). Generalizing, the client software is simply a computer program product implemented in a computer-readable medium or otherwise downloaded to the Web client over the computer network.

One of the preferred implementations of the server side component of the invention is as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

As noted above, in one embodiment the Web page is copied in its entirety. Alternatively, the present invention need not be applied to an entire page. Rather, it may be desired in some circumstances to certify only some given portion of a Web page. Thus, as used herein, "Web page" should be broadly construed to mean an entire page or some portion thereof.

One of ordinary skill will also appreciate that the technique for authenticating a Web page as described herein may be further generalized. Thus, for example, the authentication method may involve applying a given function to a first copy of the Web page to "excerpt" a given first set of data from the Web page. The first data set is then stored together with a timestamp. Upon a subsequent request to determine whether a second copy of the Web page is authentic, the same given function is then applied to the second copy to excerpt a second set of data. If the first and second sets of excerpted data satisfy a given criteria (e.g., if the data sets "match"), the second copy of the Web page is considered authentic.

Further, as used herein, "Web client" should be broadly construed to mean any computer or component thereof directly or indirectly connected or connectable in any known or later-developed manner to a computer network, such as the Internet. The term "Web server" should also be broadly construed to mean a computer, computer platform, an adjunct to a computer or platform, or any component thereof. Of course, a "client" should be broadly construed to mean one who requests or gets the file, and "server" is the entity which downloads the file.

Having thus described our invention, what we claim as new and desire to secure by Letters Patent is set forth in the following claims.

What is claimed is:

1. A method, operative at a certification server, of authenticating a copy of a Web page using information accessible from a public source, comprising the steps of:

receiving from a client a signature generated by applying a given function to a Web page or portion thereof;

generating a certification signature by retrieving the Web page using a Web page locator received from the client and applying the given function to the Web page or portion thereof;

comparing the received signature to the certification signature to determine if the received signature and the certification signature match;

in response to a determination that the received signature and the certification signature match, adding the received signature to a set of signatures stored on the certification server;

in response to receipt at the certification server of a subsequent request to authenticate a copy of a Web page or portion thereof, determining whether application of the given function to the copy of the Web page or portion thereof generates a signature maintained in the set of signatures;

in response to a determination that application of the given function to the copy of the Web page or portion thereof generates a signature maintained in the set of signatures, generating a given function of the set of signatures; and determining whether the given function of the set of signatures has a predetermined relationship to the information accessible from the public source wherein, if the given function of the set of signatures has the predetermined relationship to the information accessible from the public source, accepting the copy of the Web page or portion thereof as authentic.

2. The method as described in claim 1 wherein the given function of the set of signatures is a checksum.

3. The method as described in claim 1 wherein the public source is a published newspaper.

4. The method as described in claim 1 wherein the given function applied to the Web page or portion thereof is a one-way hashing function.

5. A computer program product in a computer-readable medium for use in a certification server to authenticate a copy of a Web page, comprising:

means for receiving from a client a signature generated by applying a given function to a Web page or portion thereof;

means for generating a certification signature by retrieving the Web page using a Web page locator received from the client and applying the given function to the Web page or portion thereof;

means for comparing the received signature to the certification signature to determine if the received signature and the certification signature match;

means, responsive to the means for comparing, for storing on the certification server the received signature in a set of signatures if the received signature and the certification signature match;

means, responsive to receipt at the server of a request to authenticate a copy of a Web page or portion thereof, for determining whether application of the given function to the copy of the Web page or portion thereof, generates a signature maintained in the set of signatures, wherein the determining means further includes means for calculating a given function of the set of signatures; and means, responsive to the determining means, for providing an indication from the certification server that the copy of the Web page or portion thereof is authentic if the application of the given function to the copy of the Web page or portion thereof generates a signature maintained in the set of signatures.

6. The computer program product as described in claim 5 wherein the determining means further includes means responsive to the calculating means for determining whether the given function of the set of signatures has a predetermined relationship with information published in a given source.

7. A computer for use as a certification server in a computer network having at least one Web client connectable to a plurality of Web servers, comprising:

a processor having an operating system associated therewith;

a certifier run by the operating system for authenticating a copy of a Web page generated at the Web client, comprising:

means for receiving from a client a signature generated by applying a given function to a Web page;

means for generating a certification signature by retrieving the Web page using a Web page locator received from the client and applying the given function to the Web page or portion thereof;

means for comparing the received signature to the certification signature to determine if the received signature and the certification signature match;

means, responsive to the means for comparing, for storing on the certification server the received signature in a set of signatures if the received signature and the certification signature match;

means, responsive to receipt at the server of a request to authenticate a copy of a Web page or portion thereof, for determining whether application of the given function to the copy of the Web page or portion thereof generates a signature maintained in the set of signatures, wherein the determining means of the certifier further includes means for calculating a given function of the set of signatures; and means, responsive to the determining means, for providing an indication from the certification server that the copy of the Web page or portion thereof is authentic if the application of the given function to the copy of the Web page or portion thereof generates a signature maintained in the set of signatures.

8. The computer as described in claim 7 wherein the determining means of the certifier further includes means responsive to the calculating means for determining whether the given function of the set of signatures has a predetermined relationship with information published in a given source.

9. A method of authenticating a copy of a Web page, comprising the steps of:

receiving from a client a signature generated by applying a given function to a Web page or portion thereof;

generating a certification signature by retrieving the Web page using a Web page locator received from the client and applying the given function to the Web page or portion thereof;

comparing the received signature to the certification signature to determine if the received signature and the certification signature match;

in response to a determination that the received signature and the certification signature match, adding the received signature to a set of signatures stored on the certification server;

in response to receipt at the certification server of a subsequent request to authenticate a copy of a Web page or portion thereof, determining whether application of the given function to the copy of the Web page or portion thereof generates a signature maintained in the set of signatures;

in response to a determination that application of the given function to the copy of the Web page or portion thereof generates a signature maintained in the set of signatures, providing an indication from the certification server that the copy of the Web page is authentic; and calculating a given function of the set of signatures.

10. The method as described in claim 9 further comprising:

determining whether the given function of the set of signatures has a predetermined relationship with information published in a given source.

11. The method as described in claim 9 wherein the given function is a one-way hashing function.

12. The method as described in claim 9 wherein the Web page locator is a Uniform Resource Locator.

13. The method as described in claim 9 wherein each signature includes a timestamp indicating a given time when the copy of the Web page or portion thereof was created.

14. The method as described in claim 9 wherein each signature includes information identifying a user that created the copy of the Web page or portion thereof.

15. A computer program product in a computer-readable medium for use in a certification server to authenticate a copy of a Web page, the computer program product comprising:

instructions for receiving from a client a signature generated by applying a given function to a Web page or portion thereof;

instructions for generating a certification signature by retrieving the Web page using a Web page locator received from the client and applying the given function to the Web page or portion thereof;

instructions for comparing the received signature to the certification signature to determine if the received signature and the certification signature match;

instructions for adding, in response to a determination that the received signature and the certification signature match, the received signature to a set of signatures stored on the certification server;

instructions for determining, in response to receipt at the certification server of a subsequent request to authenticate a copy of a Web page or portion thereof, whether application of the given function to the copy of the Web page or portion thereof generates a signature maintained in the set of signatures;

instructions for generating, in response to a determination that application of the given function to the copy of the Web page or portion thereof generates a signature maintained in the set of signatures, a given function of the set of signatures; and instructions for determining whether the given function of the set of signatures has a predetermined relationship to the information accessible from a public source, wherein if the given function of the set of signatures has the predetermined relationship to the information accessible from the public source, accepting the copy of the Web page or portion thereof as authentic.

16. The computer program product as described in claim 15 wherein the given function of the set of signatures is a checksum.

17. The computer program product as described in claim 15 wherein the public source is a published newspaper.

* * * * *